(12) United States Patent
Draisey

(10) Patent No.: US 6,598,371 B1
(45) Date of Patent: Jul. 29, 2003

(54) CAPSULES

(75) Inventor: Allan Draisey, Felpham (GB)

(73) Assignee: Stanelco Fibre Optics Ltd., Fareham (GB)

( * ) Notice: Subject to any disclaimer, the term of this patent is extended or adjusted under 35 U.S.C. 154(b) by 0 days.

(21) Appl. No.: 09/806,559

(22) PCT Filed: Sep. 30, 1999

(86) PCT No.: PCT/GB99/03238

§ 371 (c)(1),
(2), (4) Date: Mar. 30, 2001

(87) PCT Pub. No.: WO00/19963

PCT Pub. Date: Apr. 13, 2000

(30) Foreign Application Priority Data

Oct. 6, 1998 (GB) .............................................. 9821620

(51) Int. Cl.⁷ .............................. A61K 9/28; B29C 6/02
(52) U.S. Cl. ......................... 53/374.8; 53/452; 53/454; 53/479; 53/560
(58) Field of Search .......................... 53/454, 479, 560, 53/374.8, 452

(56) References Cited

U.S. PATENT DOCUMENTS

| | | | |
|---|---|---|---|
| 3,197,369 A | 7/1965 | Widmann et al. ............. 167/64 |
| 3,234,091 A | 2/1966 | Lang et al. .................... 167/64 |
| 3,832,827 A | * 9/1974 | Lemelson ................ 53/111 R |
| 4,151,274 A | 4/1979 | Schlueter et al. ............. 424/80 |
| 4,154,636 A | * 5/1979 | Motoyama et al. ......... 156/243 |
| 4,164,573 A | 8/1979 | Galinsky .................... 424/178 |
| 4,220,636 A | 9/1980 | Duscher ...................... 424/14 |
| 4,235,920 A | 11/1980 | Christensen et al. ......... 424/274 |
| 4,705,937 A | * 11/1987 | Marek ...................... 156/272.2 |
| 5,188,688 A | * 2/1993 | Boardman et al. ............. 156/69 |
| 5,456,919 A | * 10/1995 | Patell et al. ................ 424/451 |

FOREIGN PATENT DOCUMENTS

| | | | |
|---|---|---|---|
| FR | 908344 A | * 10/1962 | |
| GB | 753793 | 8/1956 | ......................... 2/3 |
| GB | 754162 | 8/1956 | ......................... 2/3 |
| GB | 763297 | 12/1956 | ......................... 81/1 |
| GB | 767826 | 2/1957 | ......................... 2/3 |
| GB | 884576 | 12/1961 | ......................... 81/1 |
| GB | 890638 | 3/1962 | ......................... 81/1 |
| GB | 896697 | 5/1962 | ......................... 2/3 |
| GB | 899059 | 6/1962 | ......................... 81/1 |
| GB | 924316 | 4/1963 | ......................... 81/2 |
| GB | 1008583 | 10/1965 | |
| JP | 0211079 | * 2/1987 | ............ A61K/7/00 |

\* cited by examiner

Primary Examiner—Rinaldi I. Rada
Assistant Examiner—Brian Nash
(74) Attorney, Agent, or Firm—William H. Holt

(57) ABSTRACT

The invention relates to a device for filling with high accuracy a finely divided powdered medicament having a particle size smaller than 10 µm into cavities having a size corresponding to the volume of powder to be filled, wherein said device comprises oscillating and rotating means for breaking down aggregates formed in the finely divided powdered medicament and filling and for compacting it in said cavities. The invention also includes a method of filling with high accuracy of a finely divided powdered medicament having a particle size smaller than 10 µm and to fill said finely divided powdered medicament into cavities, wherein the finely divided powdered medicament is transported and compacted in said cavities by oscillating and rotating means.

14 Claims, 4 Drawing Sheets

CAPSULES

This invention relates to a process and an apparatus for forming capsules, for example for the delivery of pharmaceuticals, and also to the resulting capsules.

A variety of pharmaceuticals and other materials are delivered in capsules. Where the material is a particulate material such as a powder it may be enclosed in a hard capsule, typically of elongated round-ended cylindrical shape, made in two pieces for assembly around the material. Both liquid and particulate material may be enclosed in soft capsules, these capsules being made from films of a soft elastic polymer which are brought together between rotating dies that have cavities in their surfaces. The material to fill the capsules is supplied between the films as the films deform into the cavities; as the dies move the films come together and are sealed together by application of heat and/or pressure at the dies. Both types of capsules are commonly made from gelatin films. The bonding of thermoplastic polymer films using dielectric heating (or radio frequency heating) has also been known for many years. In this process the two pieces of thermoplastic material are positioned between opposed electrodes (or one electrode and a base plate), the electrodes are pressed together, and a radio frequency voltage is applied between the electrodes. This process is however applicable only to those materials which have a significant dielectric loss index, for example greater than 0.2, over the range say 20–60 MHz, for example polyvinylchloride. Dielectric welding has not hitherto been considered suitable for welding the water-soluble polymers which are desirably used in making capsules for pharmaceuticals.

The use of dielectric heating in making capsules from a thermo-weldable material is described by Lavaud in GB-A-908 344, the strips of film passing between moulds into which the films are sucked to form opposing recesses, the recesses then being filled with a material to be encapsulated, and the films then being welded together by applying a high frequency electric current between the moulds. The capsules can then be cut from the strip. The use of films other than gelatin to encapsulate medicines has also been known for many years, for example from U.S. Pat. No. 4,154,636 (Motoyama et al.), the films being bonded by thermal adhesion with an electrical impulse heater; this document mentions water-soluble polymers such as hydroxypropyl methyl cellulose, and also polymers that can be digested. Similarly EP-A-0 211 079 describes the manufacture of two-compartment soft capsules made of films that may be of gelatin, or hydroxypropyl methyl cellulose phthalate mixed with gelatin for example to provide different solubilities.

According to the present invention there is provided a process for making capsules, the process using two films of a water-soluble polymeric material, and the process comprising the steps of deforming the films to form a multiplicity of recesses, filling the recesses with a flowable filling material, welding the films together by dielectric welding at a welding location to form a multiplicity of enclosures containing the filling material, and cutting the filled enclosures from the remaining parts of the films so as to form a multiplicity of capsules.

The films may be subjected to the said steps at a plurality of different locations, or at a single location. Performing all these steps at a single location avoids any problems with registration of the recesses with the welding or cutting means. The welding location is defined by two opposed electrodes, which can be pressed together, and to which a power supply means can provide a high frequency electrical supply.

The supply may in principle be at a frequency between 1 MHz and 200 MHz, usually between 10 MHz and 100 MHz, but stringent limits are imposed on any emitted radio waves. In practice therefore the choice of frequency may be more limited. For example the supply frequency may be 27.12 MHz, or 40.68 MHz. A tuned circuit may be electrically connected to at least one of the electrodes, for example the tuned circuit may be connected between one electrode and ground potential. For example a tuned circuit comprising an inductor and a capacitor in series may be connected between one electrode and ground potential, the tuned circuit preferably resonating at a frequency substantially that of the supply.

The electrodes defining the welding location are preferably movable towards and away from each other, to allow the films to be held and pressed between them. A heater may be associated with at least one of the electrodes, to provide heating of the films. At least one of the electrodes may comprise recesses complementary to the shape of the recesses defined in the films. Retaining means may be provided for retaining the films against the or each electrode during welding, and the retaining means may operate by suction.

The polymeric films are preferably formed into a bag before welding, and the filling material is introduced into the bag prior to welding. At least one seam of the bag may be formed by welding together the films, and this welding may be performed using heat, or by dielectric welding. One seam of the bag may be formed by folding a wider film of the polymeric material to define two opposed films. The recesses may be formed by moulding, preferably by placing the films against a mould having a multiplicity of cavities corresponding to the shapes of the recesses to be formed. The films may be moulded by suction into the cavities. The material may be softened prior to moulding, for example by heating. As indicated earlier, the several steps of the process may be performed at the same location, in which case the moulding recesses would be defined in the welding electrodes. The cutting out of the capsules is preferably performed by punching, and the punches may also be incorporated in the welding electrodes.

The filling material may be a pharmaceutical, and is a preferably a liquid. The polymeric material may be polyvinyl alcohol, which is water-soluble and biodegradable, though not edible. Where the capsules are intended to be swallowed (for example where they contain a pharmaceutical or a nutritional supplement), the polymeric material should be edible. It may for example be gelatin, or a water-soluble cellulose derivative. For example it may be hydroxypropyl methyl cellulose, which is approved for use with pharmaceuticals and in food (being indicated by the code E464 in Europe). The polymeric material must not contain any harmful or toxic additives, but may contain compounds such as glycerol (E422), glycerol mono-, di- or tri-acetate, or glycerol monostearate (E471) as plasticisers, these compounds also being edible and dispersible or soluble in water. It may also contain a preservative such as methyl 4-hydroxy-benzoate (E218). Other suitable cellulose derivatives are hydroxypropyl cellulose (E463), and methyl ethyl cellulose (E465).

The invention also provides an apparatus for making and filling capsules by the method specified above, comprising one or more stations operable to implement sequentially the steps of the method specified above. In a further aspect, the invention provides a capsule formed by the method or apparatus of the invention.

The invention will now be further and more particularly described, by way of example only, and with reference to the accompanying drawings, in which.

Figure 1:
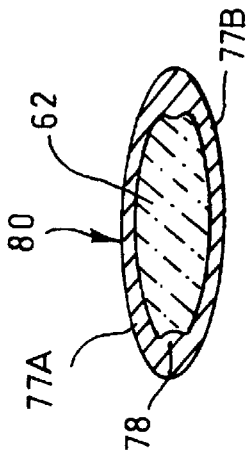
FIG. 1 is a schematic representation of one type of dielectric welding apparatus.

Referring to FIG. 1 this shows schematically a welding apparatus 10 for use in welding polymeric material 12, which may be an ingestible, pharmaceutical grade material, such as a cellulose derivative such as hydroxypropyl methyl cellulose. Two electrodes 14 define between them a welding location or welding station 16. A power supply 18 provides a high frequency supply to both electrodes 14. In this specification the term high frequency is used in the sense conventional in the polymer industry, and in particular to encompass a frequency such as 27.12 MHz which is permissible for use in Europe for dielectric welding of polymeric materials. Each electrode 14A, 14B is supplied with the same feed, but one electrode 14B is connected through a tuned circuit 20 to earth potential. The tuned circuit 20 includes an inductor 22 and a capacitor 24 connected in series, with the inductor 22 connected to the electrode 14B and the capacitor 24 to earth. This circuit 20 has a resonant frequency at which its impedance is a minimum, and its components are selected so the resonant frequency is at (or close to) the frequency of the supply 18. This allows relatively high current to pass, without generating high HF voltages in the vicinity of the electrodes 14.

The electrodes 14 are also provided with actuators 26 which move the electrodes 14 towards or away from each other, as indicated by the double headed arrow 28. These actuators 26 may be hydraulic, pneumatic, or electro-mechanical. (It will be readily apparent that alternatively one electrode might be fixed, and the other be movable.)

The apparatus 10 is used in the following manner. Firstly, two sheets of polymeric material 12 are placed between the electrodes 14, which are then brought together by the actuators 26 to clamp the sheets 12. The power supply 18 is turned on, and the polymeric material 12 becomes heated between the electrodes 14 because of dielectric losses in the polymer. The opposed faces of the sheets 12 become hot enough to fuse together, whereas the outer faces which are in contact with the electrodes 14 remain at the temperature of the electrodes 14. Thus the sheets 12 are welded together at the locations where they are clamped between the electrodes 14, and after an appropriate time the electrodes 14 can be retracted to release the welded sheets 12. In one example a power supply 18 working at a frequency of 27.12 MHz and a voltage of about 6 kV produced a satisfactory weld in a sheet of hydroxypropyl methyl cellulose of thickness about 0.1–0.2 mm, in a time of about 3 s. It is envisaged that welding could be achieved in the manner described at various frequencies, for example in the range 1 MHz to 100 MHz, and for sheet thicknesses up to about 1 mm, with the welding time changing as the thickness increases. This process has been found to provide good quality welds without damaging the polymeric material, and in particular ionization, arcing, burning and degradation of the material are found not to occur.

Figure 2:
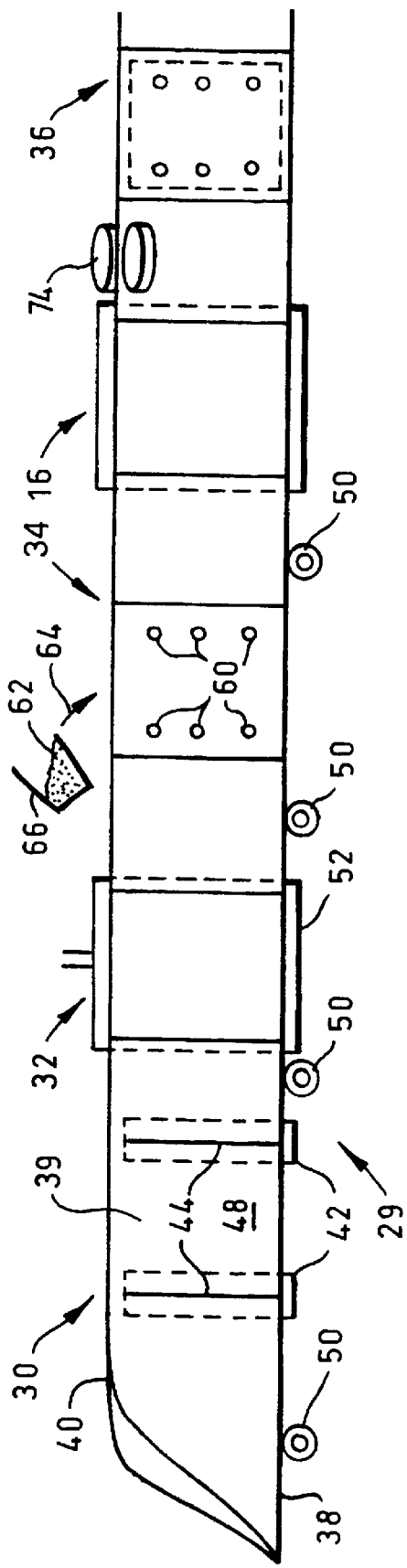
FIG. 2 is a schematic diagram (on a reduced scale in comparison to FIGS. 3 to 6) showing an apparatus for producing capsules.

Referring now to FIG. 2 an apparatus 29 is shown for making filled capsules, particularly intended for the pharmaceutical industry. The figure shows schematically the path of a strip 39 of polymeric material (such as hydroxypropyl methyl cellulose) through successive processing stations: a bag-forming station 30, a recess-forming station 32, a filling station 34, a welding station 16, and a punching station 36. The material 39 enters the apparatus 29 at the left (as shown) and advances through the apparatus 29 to leave towards the right (as shown). Prior to the bag-forming station 30, two sheets of polymeric material, both in the form of elongate strips, are brought together in alignment and in a generally vertical plane. The two sheets may be separate initially, but are preferably formed by forming a fold 38 along the length of a wider strip 39, so that the fold 38 forms the bottom of the folded strip 39, which is therefore open along its top edge 40.

At the bag-forming station 30, two pairs of electrodes 42 are brought together to clamp the strip 39 along two transverse lines 44. The electrodes 42 are arranged as in the apparatus 10 of FIG. 1 to provide welds along the lines 44, thereby forming an open-topped bag in the region 48, bounded by the welds 44 at either side, and by the fold 38 beneath. The transverse lines 44 extend down to the fold 38, but do not extend all the way to the top edge 40 of the strip 39. After this bag has been formed, the strip 39 is advanced by appropriate rollers 50 (or other drive arrangements) located along the length of the strip 39. The rollers 50 are arranged to provide accurate indexing of the strip 39 at each movement.

Figure 3:
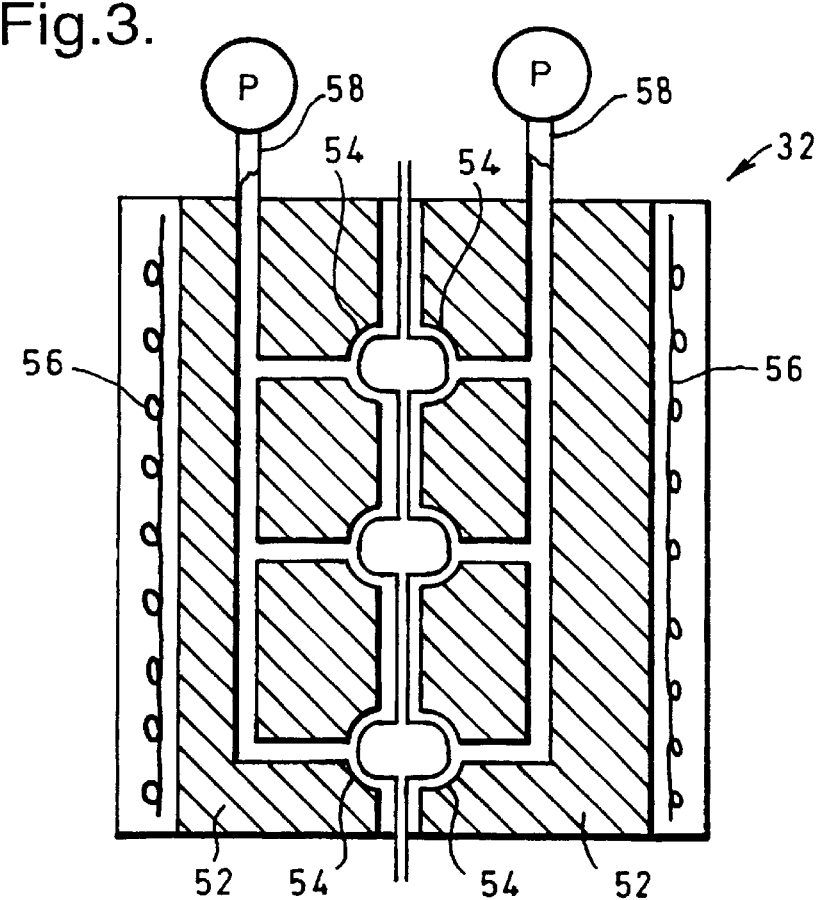
FIG. 3 is a schematic vertical section through the bag-forming station of the apparatus of FIG. 2.

The strip 39 next moves to a recess forming station 32. At the station 32, which is shown in section in FIG. 3, the bag formed at the station 30 is clamped between two mould tools 52 each of which has a multiplicity of cavities 54 forming an array across its face. Heating elements 56 are provided behind the tools 52. Air passages 58 are provided through the tools 52, communicating with each cavity 54, and a pump P communicates with the end of each air passage 58. With the strip 39 clamped between the tools 52, the heaters 56 soften the material 12, allowing it to be deformed by drawing into the cavities 54 under suction provided by the pumps P. The heating temperature and suction force required will depend upon the size of the cavities 54 and on the nature of the material of the strip 39. After the material has been drawn into the cavities 54, the station 32 is allowed to cool, setting the material to the new shape, in which the bag has an array of recesses 60 formed across each wall. (It is envisaged that recesses 60 will be formed in both opposed walls of the bag, so the final capsules will be symmetrical, but alternatively the capsules may be formed from recesses in only one wall of the bag.) In FIG. 2 the station 32 is indicated as producing six such recesses 60, but in practice a larger number such as twenty-five recesses 60 could be formed simultaneously, or as many as two hundred recesses.

Figure 4:
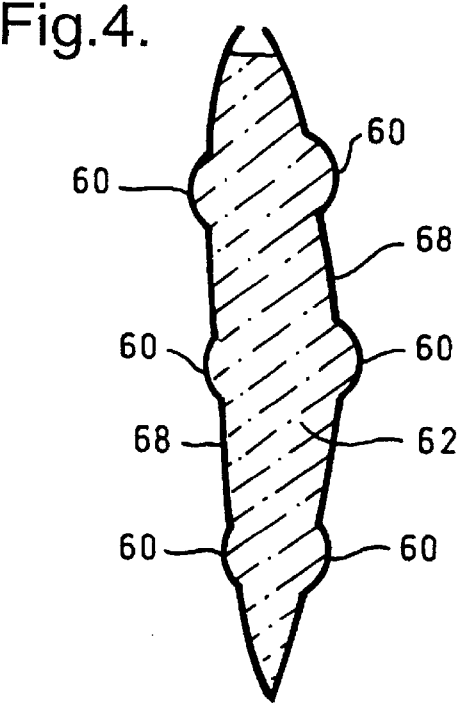
FIG. 4 is a vertical section through a filled bag formed at the filling station of FIG. 2.

The bag with wall recesses is next advanced to the filling station 34, at which the interior of the bag is filled with the material required within the capsules. This step is shown schematically in FIG. 2 as capsule-filling material 62 being poured into the bag at 64 from a beaker 66. The bag may be over filled, as may be seen in FIG. 4, to ensure that every recess 60 is entirely filled with the material 62, there also being a substantial surplus of material 62 within the bag. At this stage this excess material 62 holds the two walls 68 of the bag apart.

Figure 5:
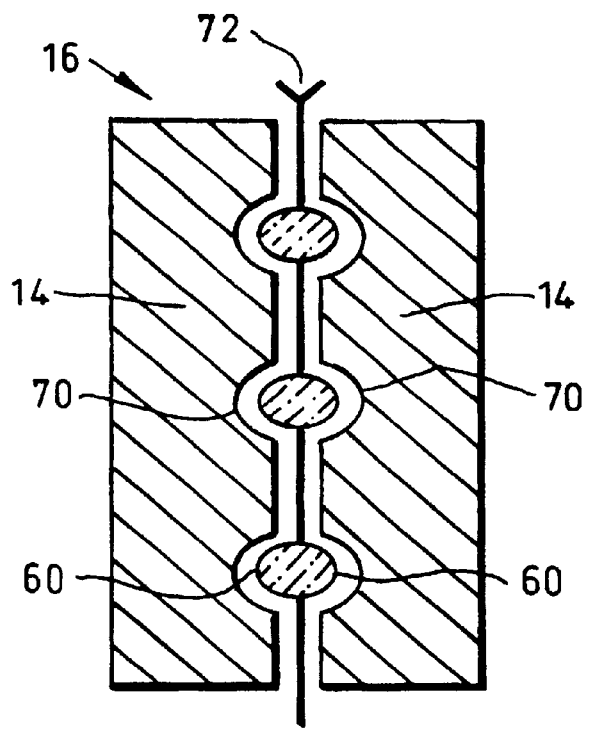
FIG. 5 is a schematic vertical section through the welding station of FIG. 2.
Figure 6:
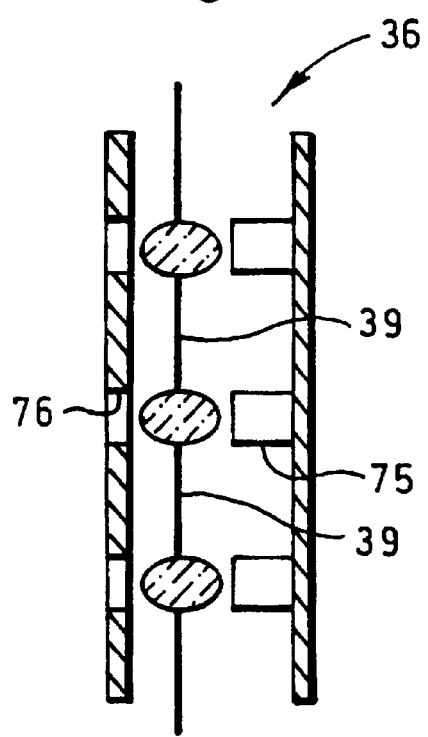
FIG. 6 is a schematic vertical section through the punching station of FIG. 2.

The filled bag now moves to the welding station 16, shown also in FIG. 5. At this station two welding electrodes 14 are brought together to clamp the bag. Each electrode 14 defines an array of cavities 70 in its face, and these cavities 70 align with the recesses 60 in the bag, after the bag has indexed to the welding station 16. The relatively small size of pharmaceutical capsules of the type being produced, together with the need for the recesses 60 to align with the cavities 70 imposes a requirement for accurate indexing on the drive mechanism 50. FIG. 5 shows the welding station 16 with the electrodes 14 closed together, clamping the opposed walls of the bag together (apart from the parts of the bag walls which form the recesses 60). This forces surplus material 62 to the top of the bag, at 72, but allows the recesses 60 to remain filled with the material 62. (If required, heaters and/or air passages and pumps might be provided, similar to those used in the recess forming station 32, in order to ensure that the recesses 60 retain their form while clamped at the welding station 60.) The welding station 16 is electrically connected as described above in relation to FIG. 1 so that, on actuation of the supply 18, the two sheets of the strip 39 are welded together over the whole area of the bag walls, with the exception of the recesses 60. This results in an array of filled capsules each sealed and connected together by a web of welded strip 39.

After welding, the array of capsules is moved along to a punching station 36. As the welded bag leaves the station 16, rollers 74 either side of the strip 39 nip the top 72 of the bag, which causes the surplus material 62 to be forced back along the strip, so the surplus runs into the next bag being filled at the filling station 34, thus reducing or eliminating waste caused by the initial over filling of the bag. At the punching station 36 accurate indexing is again required, on this occasion in order to align with male and female punching parts 75 and 76. The male parts 75 have a cutting-edge of the size and shape of the recesses 60. The female parts 76 form correspondingly sized apertures, so that as the punching parts 75 and 76 are brought together, the filled capsules are cut or punched out from the welded strip 39.

Figure 7:
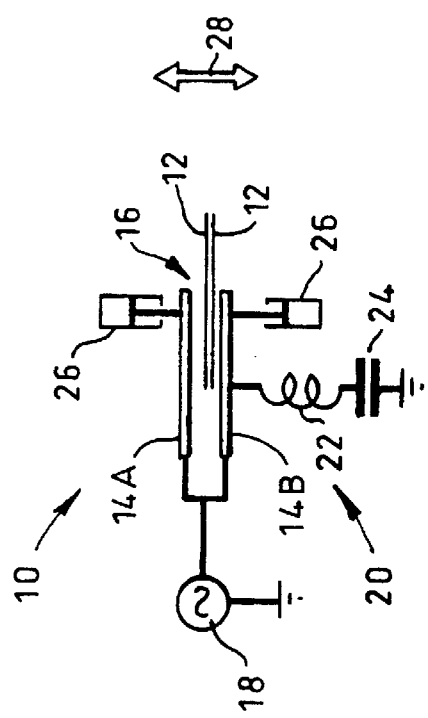
FIG. 7 is a vertical section, on an enlarged scale, through a capsule formed by the apparatus of FIG. 2.

Referring now to FIG. 7, the resulting capsules 80 consist of two halves 77A and 77B formed from the two opposed sheets of the strip 39, welded around a continuous seam 78 to define a closed volume filled with the material 62. Because the polymeric material melts during the welding process, a bead of molten material forms around the welded seam on the inside of each capsule 80, so that after the capsules have been cut out the wall thickness is slightly thicker around the seam 78. The sealed nature of the capsules 80 allows the material 62 to be liquid, so that a wide range of pharmaceuticals can be delivered with such a capsule 80. By way of example each capsule 80 might be of ellipsoidal shape, 10 mm long and 7 mm wide. The use of a cellulose derivative (such as hydroxypropyl methyl cellulose) for the sheet 39, and so for the walls of the capsule, has advantages in view of the proven use of such material for pharmaceutical applications, and in view of its solubility in water and its lack of toxic effects.

The solubility of the capsule walls means that the capsules will break down quickly in a patient's stomach, giving rise to a fast release of the pharmaceutical. For some applications the speed of release may be excessively fast. In that case, or for aesthetic reasons or reasons of taste and handling, the capsules might be embedded in additional material such as a sugar coating for improved taste, or a less soluble coating to slow down release.

It is apparent from the description of the welding arrangements, that direct contact is made between the electrodes 14 and the sheet 39 of material being welded. Barrier sheets commonly used in dielectric welding are not required or used. This increases the acceptability of the process for pharmaceutical use, in avoiding the use of a potential source of contamination, particularly in view of the fibrous nature of common barrier materials. A particular advantage of the present invention is that the capsules 80 can be filled with liquid. The liquid may be a solution of a pharmaceutically active material, or a medicine in liquid form, or an emulsion of pharmaceutical material in a liquid, or a pharmaceutically active oil or other liquid. It will be readily understood that the filling material must be compatible with the material of the strip 39 and in particular that water and aqueous solutions are not desirable in view of the highly soluble nature of the cellulose derivative.

Many variations and modifications may be made to the apparatus described above without departing from the scope of the present invention. For example the order of the bag-forming station 30 and the recess forming station 32 might be reversed. In this case the recess forming station 32 might include a heating element located between the sheets 39, with appropriate provision to prevent heated material from sticking. The sizes of the bags and capsules, the layout of the recesses, the number of recesses formed in each bag, and the volume of the finished capsules can be widely varied. It is also envisaged that three sheets might be welded together in a single operation, with recesses in the outer sheets, so that a two-compartment capsule could be produced in which each compartment held a different material. The three sheets could begin as separate sheets, or as one sheet folded with a third sheet introduced between or alongside. Pharmaceutical grade cellulose derivatives are highly preferred, but other materials such as gelatin may be used. It is also possible to fill the capsules with a powder, but welding characteristics can be expected to change because the powder is likely to behave differently from a liquid during the dielectric welding process. The apparatus of FIG. 2 has been described as processing a single strip of material 39. Alternatively each bag could be formed separately, and moved between the stations by individual handling. However continuous strip feeding, with the consequential reduction in the need to handle separate items, is preferable. The number of stations could be reduced if more than one operation was performed at each station, either simultaneously or sequentially. Indeed, all operations might take place at the same location, but references to a series of stations is believed to assist understanding of the invention.

Figure 8:
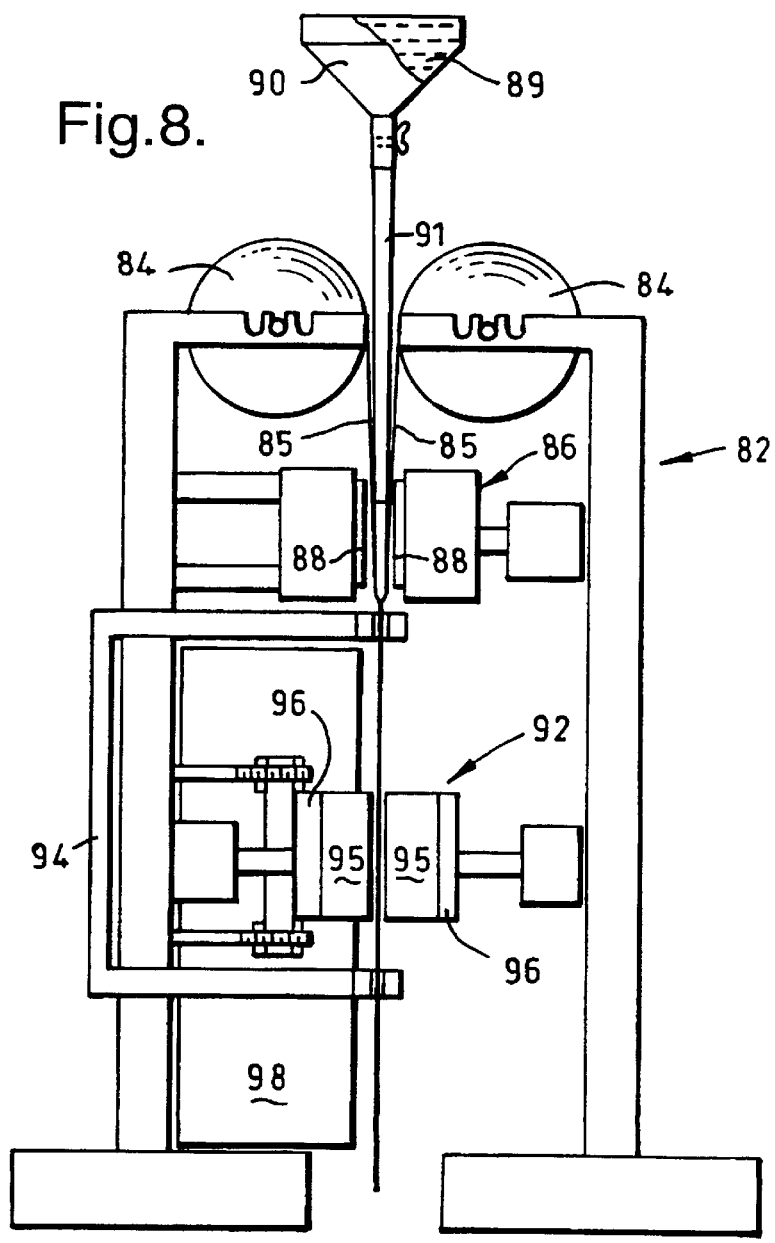
FIG. 8 is a schematic diagram of an alternative apparatus for producing capsules.

Referring now to FIG. 8 an alternative apparatus 82 is shown, the principal differences from the apparatus 29 of FIG. 2 being that it incorporates only two processing stations, and that the films of polymeric material move vertically downwards through the apparatus 82. Rolls 84 supply two continuous strips 85 of a hydroxypropyl methyl cellulose film containing a plasticiser to a seam forming station 86. At the seam forming station 86 the two edges of the strips 85 are pressed between retractable bars 88 of length 105 mm heated to 175° C., so the edges are welded together. The entire length of the strips 85 below the station 86 consequently define a tube or bag. The filling material 89 for the capsules is dispensed from a storage vessel 90 via a duct 91 into this tube. Below the seam forming station 86 is a recess-forming and welding station 92 that is of height 100 mm. Operations of the seam forming station 86 and the welding station 92 are synchronized, and a transfer mechanism 94 moves the tube formed from the strips 85 downwardly in steps of 100 mm.

Figure 9:
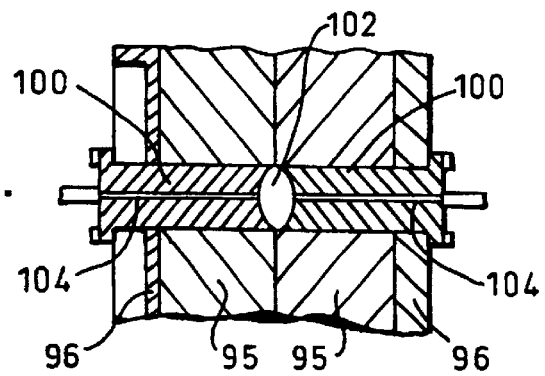
FIG. 9 is a vertical sectional view of part of the apparatus of FIG. 8.

The recess-forming and welding station 92 comprises two opposed retractable brass electrodes 95 whose opposed faces define matching arrays of apertures, for example thirty oval apertures. Each electrode 95 is mounted on an electrical heater 96 so that it is at a temperature of about 75° C. One electrode 95 is connected to earth, while the other is connected by a copper strip to a high frequency generator 98. Referring now to FIG. 9, this shows a sectional view of part of the station 92, showing just one of the pairs of apertures on the electrodes 95. Close fitting within each aperture is a rod 100 of hard plastic (polyether ether ketone), whose end is curved concavely to define a recess 102 at the surface of the electrode 95, and which has an axial bore 104 throughout its length. The rods 100 are close fitting within the respective apertures, but are able to move axially about 1 mm against a spring (not shown).

Thus in operation of the station 92, a section of tube formed from the strips 85 is moved downwardly by the mechanism 94 into the station 92. The electrodes 95 are moved towards the strips 85, and after a few seconds (to allow the films 85 to heat up and soften), suction is applied by a pump (not shown) to each of the bores 104. Each film 85 therefore deforms to form an array of thirty recesses. All these recesses are full of the material 89.

The electrodes 95 are then pressed firmly together (so excess material 89 moves to the portion of the tube above the station 92), and the high frequency generator 98 is activated to generate a signal at 40.68 MHz. This might for example be between 1 kW and 6 kW, and be applied for a period of between 1 and 6 seconds. Dielectric welding of the strips 85 therefore occurs over the whole area of the electrodes 95, with the exception of the recesses 102. This results in an array of filled capsules each sealed and connected together by a web of welded strips 85. The rods 100 are then displaced sideways (say to the right in FIG. 9) by 1 mm, and then released, so the capsules are punched out of the strips 85 by the ends of the rods 100 from the left hand electrode 95 engaging with the apertures in the right hand electrode 95. Finally the electrodes 95 are moved apart, releasing the perforated web and the capsules which are substantially identical to those shown in FIG. 7.

It will be appreciated that the apparatus 82 avoids the problems of registration between recesses and apertures that arise with the apparatus 29, but that the station 92 is somewhat more complex than the stations used in the apparatus 29. It has also been found that the presence of a plasticiser, such as glycerol monostearate, in the films 85 of water-soluble cellulose derivative, is desirable as it improves the welding process. It will be understood that the apparatus 82 may be modified in various ways, for example to form a different number of recesses, or for example by making the rods 100 out of a different hard material such as a stainless steel.

What is claimed is:

1. A process for making capsules from films of polymeric material, said process comprising the steps of deforming said films for forming a multiplicity of recesses, filling said recesses with a flowable filling material, welding said films at a welding location for forming a multiplicity of enclosures containing said filling material, and cutting the filled enclosures from the remaining parts of said films for forming a multiplicity of capsules, wherein the welding process is dielectric welding performed between two opposed electrodes, and said process uses two films comprising a water-soluble polymeric material.

2. A process as claimed in claim 1 in which said films are subjected to said steps at a plurality of different locations, one said step being performed at each said location.

3. A process as claimed in claim 1 in which the films (85) are subjected to a plurality of the said steps at a single location (92).

4. A process as claimed in claim 1 in which said step of dielectric welding is performed at a frequency between 1 MHz and 100 MHz.

5. A process as claimed in claim 1 in which a tuned circuit is connected electrically to at least one of said dielectric welding electrodes.

6. A process as claimed in claim 1 in which a heater is associated with at least one of said electrodes, for providing heating of said films.

7. A process as claimed in claim 1 in which said films are formed into a bag before welding, and said filling material is introduced into said bag prior to said step of welding.

8. A process as claimed in claim 1 in which said polymeric material is edible.

9. A process as claimed in claim 8 in which said polymeric material is hydroxypropyl methyl cellulose.

10. A process as claimed in claim 1 wherein in said dielectric welding step the voltage between the electrodes is restricted.

11. A process as claimed in claim 1 wherein each said film also includes a plasticiser.

12. A process for making capsules from films of polymeric material, the process comprising the steps of deforming said films for forming a multiplicity of recesses, filling said recesses with a flowable filling material, welding said films at a welding location for forming a multiplicity of enclosures containing said filling material, and cutting the filled enclosures from the remaining parts of the films for forming a multiplicity of capsules, wherein the welding process is dielectric welding performed between two opposed electrodes, and the process uses two films comprising a water-soluble edible polymeric material containing a plasticiser.

13. A process as claimed in claim 12 wherein the voltage between the electrodes is restricted during the dielectric welding process.

14. A process for making capsules from films of polymeric material, said process comprising the steps of deforming said films for forming a multiplicity of recesses, filling said recesses with a flowable filling material, welding said films at a welding location for forming a multiplicity of enclosures containing said filling material, and cutting the filled enclosures from the remaining parts of said films for forming a multiplicity of capsules, wherein the welding process is dielectric welding performed between two opposed electrodes, and said process uses two films comprising a water-soluble polymeric material containing a plasticiser that is dispersable or soluble in water.

* * * * *

UNITED STATES PATENT AND TRADEMARK OFFICE
CERTIFICATE OF CORRECTION

PATENT NO. : 6,598,371 B1
DATED : July 29, 2003
INVENTOR(S) : Allan Draisey

It is certified that error appears in the above-identified patent and that said Letters Patent is hereby corrected as shown below:

<u>Title page,</u>
Item [57], ABSTRACT,
The following ABSTRACT is substituted for the ABSTRACT:
-- Capsules, for example for the delivery of pharmaceuticals, are produced from two films of a water-soluble polymeric material, by deforming the films to form a multiplicity of recesses, and filling the recesses with a flowable filling material. The films are then welded together by dielectric welding to form filled capsules, which are cut or punched out of the welded film. These steps may be performed at a single location so as to avoid any problems with registration of the recesses with the welding or cutting means. The polymeric material may be gelatin, or a water-soluble cellulose derivative such as hydroxypropyl methyl cellulose, and may also contain a plasticiser. --

Signed and Sealed this

Twenty-eighth Day of October, 2003

JAMES E. ROGAN
*Director of the United States Patent and Trademark Office*